W. S. ROCKWELL.
TIRE HEATING FURNACE.
APPLICATION FILED MAR. 25, 1918.
1,274,603.
Patented Aug. 6, 1918.
3 SHEETS—SHEET 2.
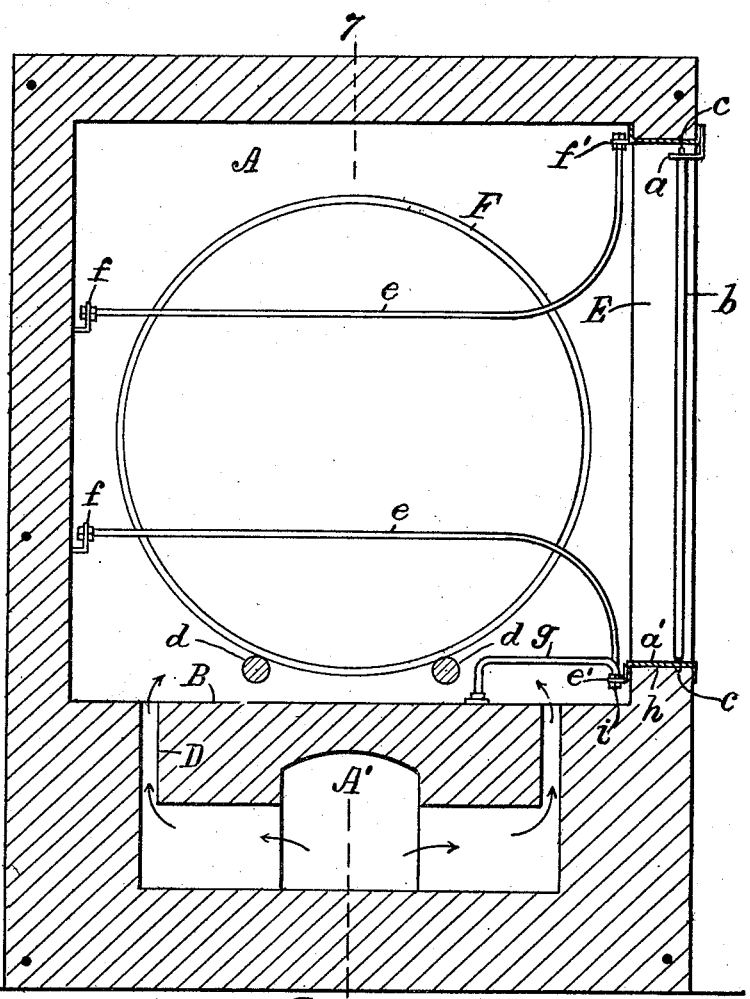
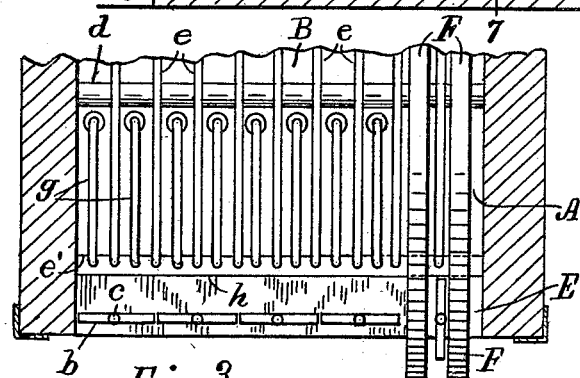
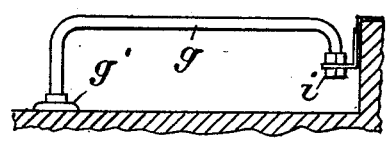
Walter S. Rockwell,
Inventor. per Thomas S. Crane, Atty.

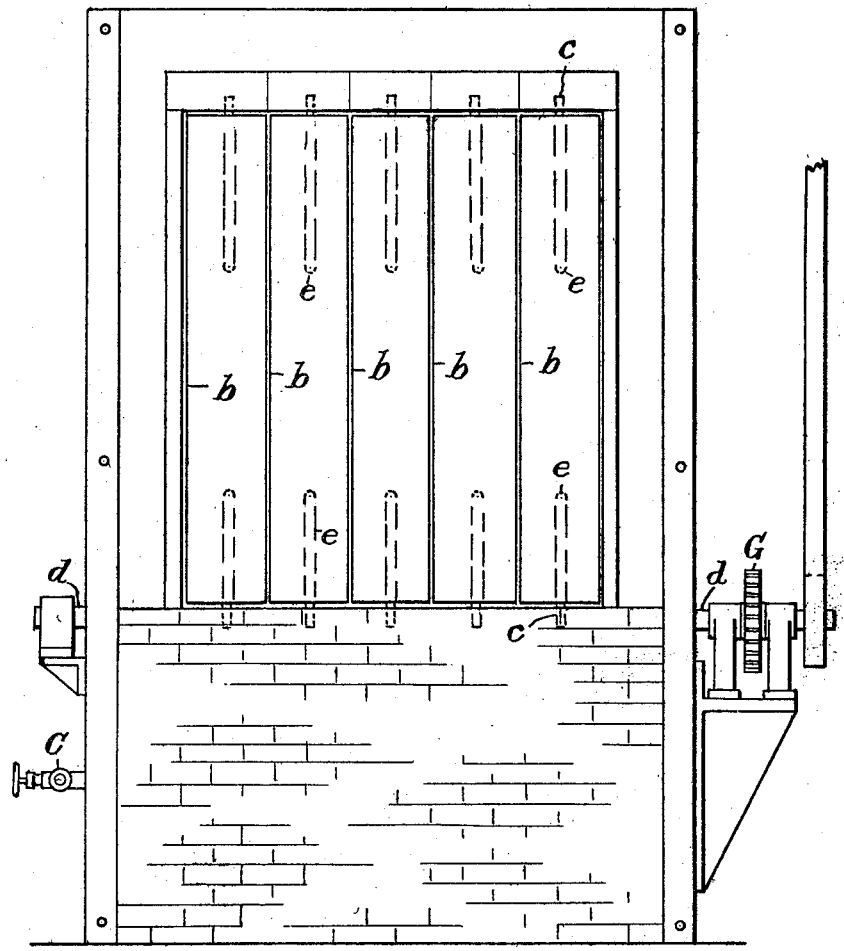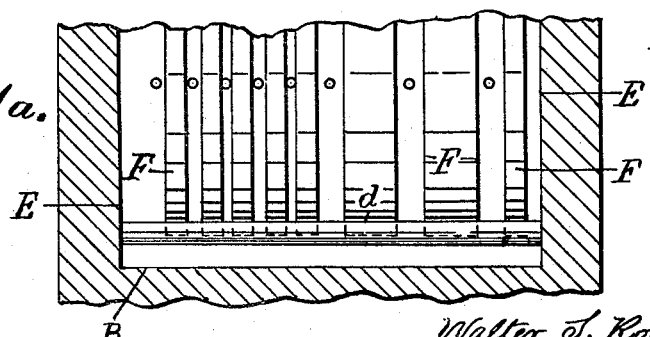

W. S. ROCKWELL.
TIRE HEATING FURNACE.
APPLICATION FILED MAR. 25, 1918.
1,274,603.
Patented Aug. 6, 1918.
3 SHEETS—SHEET 3.
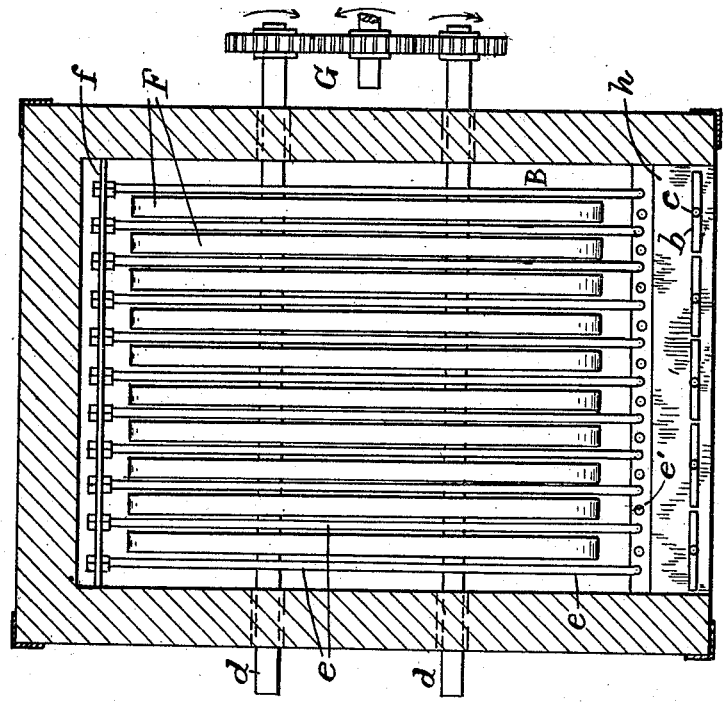
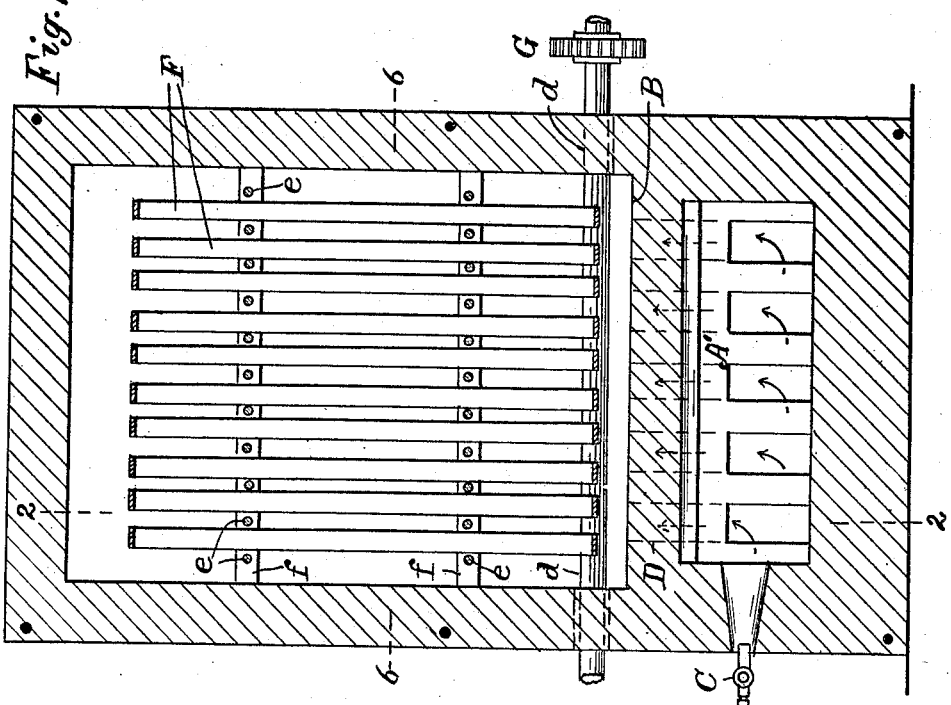
Inventor. Walter S. Rockwell,
per Thomas S. Crane, Atty

UNITED STATES PATENT OFFICE.

WALTER S. ROCKWELL, OF NEW YORK, N. Y., ASSIGNOR TO W. S. ROCKWELL COMPANY, OF NEW YORK, N. Y., A CORPORATION OF NEW JERSEY.

TIRE-HEATING FURNACE.

1,274,603.      Specification of Letters Patent.      Patented Aug. 6, 1918.

Application filed March 25, 1918. Serial No. 224,453.

*To all whom it may concern:*

Be it known that I, WALTER S. ROCKWELL, a citizen of the United States, residing at 300 West 106th street, New York, county of New York, and State of New York, have invented certain new and useful Improvements in Tire-Heating Furnaces, fully described and represented in the following specification and the accompanying drawings, forming a part of the same.

The present invention relates to a furnace for heating tires or hoops of considerable diameter, which require to be rotated during the heating operation to expose all parts of the tire equally to the heat in the furnace-chamber.

The furnace may be used for heating tires to shrink upon vehicle wheels, as such operation does not require an excessive heat like forging, and it may also be used for tempering such tires or circular disks.

The invention is adapted to heat a considerable number of tires arranged side by side in the heating-chamber upon the rolls which are required to rotate them.

The primary object of the invention is to facilitate the successive introduction to and the removal of the tires from the heating-chamber without wholly opening the doorway through which the tires are introduced, or exposing those in the chamber to cold drafts; and this is effected by forming the doorway substantially as wide as the heating-chamber and closing the door-opening by a plurality of vertically pivoted door-plates which, when turned in line with one another, form a complete closure to the doorway.

These door-plates are not, like hinged-doors, hung upon pintles outside of the furnace-wall or upon a furnace-front, but are located between the opposed flat sides of the doorway and preferably clear the flat sides, so that the plates can be readily turned transverse to the doorway. The pivot-bearings for the door-plates are therefore located upon the upper and lower faces of the doorway within the outer side of the doorway, and permit a series of three or more plates to be fitted within the doorway in line with one another, so as to independently close sections of the same doorway.

Guides are arranged in the heating-chamber at right-angles to the rolls which rotate the tires, and in line with the narrow openings formed by turning the door-plates. The guides may be formed of rods connected at opposite ends to guide-supporting bars, affixed to the front and rear sides of the heating-chamber.

When one of the door-plates is turned crosswise to the doorway, it forms vertical slots at opposite sides of the turned plate, so that the tires may be inserted through such slots, and the guide-rods are preferably disposed in line with the pivots of the door-plates, and also in line with the edges of the plates when turned in a common plane, so as to leave channels between those points for the reception of the tires.

The rolls for rotating the tires extend across the bottom of the heating-chamber, and a sill is extended across the doorway on the level of such rolls, and skids are extended from the sill nearly to the said rolls to support and guide the tires to or from the tops of the rolls.

The constructive features employed to embody this invention are shown in the annexed drawing, in which Figure 1 is a front elevation of the furnace; Fig. 1ª is a diagram showing tires of different widths between the guides; Fig. 2 is a section on line 2—2 in Fig. 7; Fig. 3 shows the front end of the heating-chamber in plan, with the guides and skids for supporting the tires; Fig. 4 is a side view of one of the skids attached to the guide-supporting bar upon the door-sill; Fig. 5 is a plan of the skid and its foot; Fig. 6 a plan of the furnace with the skids omitted; and Fig. 7 is a section on line 7—7 in Fig. 2.

The furnace is shown with heating-chamber A and combustion-chamber A' below the chamber-floor B, supplied with fluid-fuel by a burner C, the products of combustion passing upward into the chamber by flues D; but any convenient means may be used for heating the chamber, and venting it.

The doorway E is shown of substantially the same width as the heating-chamber, and of suitable height to admit the tires F.

Bearing-plates $a$ and $a'$ are fixed within the upper and lower faces of the doorway, and a series of five door-plates $b$ is shown with pivots $c$ fitted to bearings in the bearing-plates. The pivot-bearings are within the doorway in line with one another, between the opposite sides of the doorway, and may be proportioned so that the edges of the door-plates clear one another and the door-frame, so that they can be turned in either direction transverse to the doorway when opening a section of the same to insert or remove the tires.

By reason of their vertical arrangement, the door-plates remain in any position to which they are moved, and are represented in Fig. 1 as turned all in the same plane to form a complete closure of the doorway.

In Fig. 3 a part of the door-plates are shown turned crosswise of the doorway to admit and withdraw the tires.

When thus turned, it is apparent from Fig. 3 that tires may be inserted at opposite sides of each door-plate, and guide-rods $c$ are therefore arranged within the chamber in a line with the pivots $c$, or intermediate to the same, so that one or two tires may be inserted or withdrawn by turning one of the door-plates.

The guides are formed of rods which are conveniently held in place by insertion at the front and rear of the furnace into guide-supporting bars $e'$, $f$ and $f'$. The supporting-bar $e'$ is affixed within the bottom of the doorway and the supporting-bar $f'$ within the top of the doorway, and two of the bars $f$ upon the rear wall of the chamber A.

These supporting-bars are formed with holes through which threaded ends upon the guide-rods $e$ may be inserted and secured therein by lock-nuts $i$. This construction makes them detachable at pleasure for re-arrangement. The supporting-bars may be formed with numerous holes, to permit the arrangement of the guide-rods $e$ in different positions nearer or farther apart to suit tires of different widths.

A disposition of the guide-rods to support narrow and wide tires in the same furnace-chamber, is shown in Fig. 1$^a$, the tires F being relatively narrower and the tires F$'$ much wider.

With five door-plates, as shown in Figs. 1 and 3, ten tires may be inserted, as shown in Figs. 6 and 7, Fig. 6 showing the chamber filled with tires and the door-plates closed.

The driving-rolls $d$ are placed within the heating-chamber just above the bottom of the same, and a door-sill $h$ is provided at the bottom of the doorway at a level with the roll-tops.

To support the tires when introduced over the sill until they rest upon the rolls, skids $g$ are provided of the same height as the sill and the rolls.

A simple construction for the skids is shown in Figs. 3, 4 and 5, formed each of a rod provided with a foot $g'$ at one end to rest upon the floor B near the roll $d$, and the opposite end threaded and fitted to a hole in the supporting-bar $e'$ in which it may be detachably secured by lock-nuts $i$.

Such skids, as shown in Fig. 3, are arranged intermediate to the guide-rods $e$ to support the tread of the tires as they are rolled through the doorway to or from the rolls $d$, which are driven by gearing G.

The detachable connection of the skids and guide-rods $e$ to the bars $e'$, $f$ and $f'$ permits them to be rearranged at different distances apart to admit tires of different widths, as shown in Fig. 1$^a$.

Such details of construction may be varied, and guides or floor-supports of any suitable character used to support the tires in connection with the rotatable door-plates.

It will be observed that the door-plates in my invention have journals pivoted in bearing-plates $a$ and $a'$ supported upon the upper and lower faces of the doorway, thus enabling the door-plates to turn within the doorway and to thus close the same without overlapping upon the door-frame, as is required with ordinary doors.

In the operation of the furnace, one tire is inserted at a time until all the space is occupied. They are then removed one at a time, in the same order in which they were inserted, as the one first placed in the chamber would be exposed to the heat the longest time.

During the insertion and removal of the tires, only one of the door-plates is opened at a time, thus greatly limiting the escape of hot gases from the furnace, or the introduction of cold air which would chill the contents.

Having thus set forth the nature of the invention what is claimed herein is:

1. In a tire heating furnace, the combination, with the heating-chamber having a doorway adapted to admit tires side by side, and the doorway having opposed flat sides and upper and lower faces with pivot-bearings thereon between the opposed sides, of a series of three or more vertically rotatable door-plates having their pivots intermediate their edges and fitted to the bearings on the said upper and lower faces within the flat sides of the doorway and clear of the said sides, and operating to close the doorway when turned in line with one another.

2. In a tire heating-furnace, the combination, with the heating-chamber having a doorway adapted to admit tires side by side, of a plurality of vertically pivoted rotatable door-plates operating to close the entire doorway, and guides within the heating-chamber in line with the pivots of the door-plates, to support the tires during the heating operation.

3. In a tire heating furnace, the combination, with the heating-chamber having a doorway adapted to admit tires side by side, and the doorway having opposed flat sides and upper and lower faces with bearing-plates upon the said faces between the opposed sides of the doorway, and a series of three or more door-plates pivoted in such bearing-plates in line with one another between the opposed sides of the doorway, and the edges of the door-plate proportioned to wholly clear one another and the door-frame.

4. In a tire heating furnace, the combination, with the heating-chamber having a doorway adapted to admit tires side by side, of guide-supporting bars affixed to the front and rear sides of the heating-chamber, and provided with a series of holes or openings to admit guide-rods, and guide-rods secured detachably in the said openings.

5. In a tire heating furnace, the combination, with the heating-chamber having a doorway adapted to admit tires side by side, of rolls in the bottom of the chamber for rotating the tires, a sill level with the roll-tops in the bottom of the doorway, and skids extended between the sill and the nearer roll to guide the tires to the said roll.

6. In a tire heating furnace, the combination, with the heating-chamber having a doorway adapted to admit tires side by side, of rolls in the bottom of the chamber for rotating the tires, a sill level with the roll-tops in the bottom of the doorway, guide-supporting bars affixed respectively to the inner side of the door-sill and the rear wall of the chamber, guide-rods secured to the said bars, and skids secured to the guide-supporting bar at the sill intermediate to the guide-rods, and extending from the sill to the nearer roll to support and guide the tires thereto.

In testimony whereof I have hereunto set my hand.

WALTER S. ROCKWELL.

Copies of this patent may be obtained for five cents each, by addressing the "Commissioner of Patents, Washington, D. C."